UNITED STATES PATENT OFFICE.

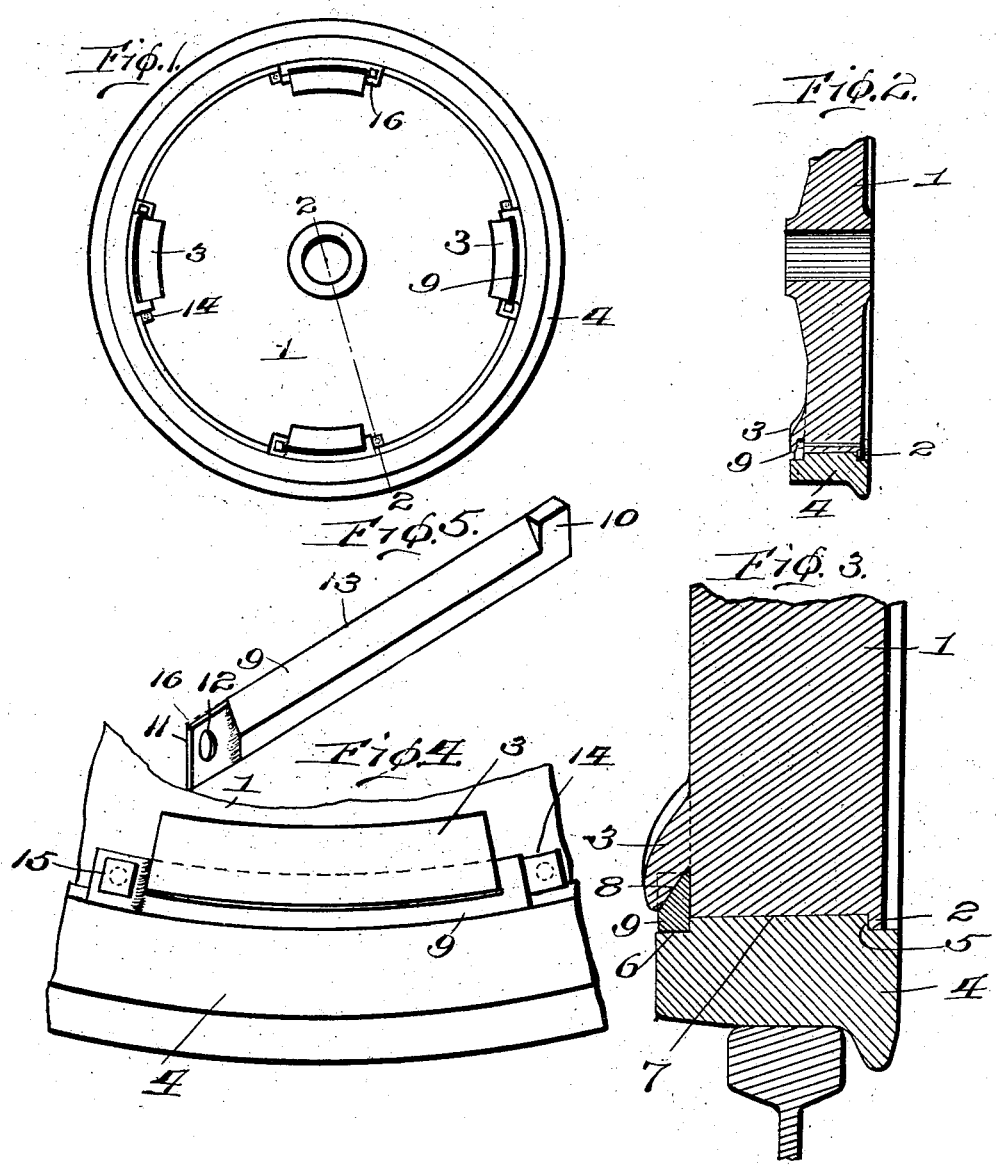

THOMAS J. KELLY, OF DENVER, COLORADO.

TIRE-LOCK.

1,041,632.  Specification of Letters Patent.  Patented Oct. 15, 1912.

Application filed July 9, 1912. Serial No. 708,501.

*To all whom it may concern:*

Be it known that I, THOMAS J. KELLY, a citizen of the United States, residing at Denver, in the county of Denver and State of Colorado, have invented certain new and useful Improvements in Tire-Locks; and I do hereby declare the following to be a full, clear, and exact description of the invention, such as will enable others skilled in the art to which it appertains to make and use the same.

This invention relates to improvements in means for fastening tire rims to the body of car wheels, and an object of the invention is to provide a plurality of such fastening means spaced so as to leave the greater part of the joint between the rim and the body of the wheel visible.

A further object of the invention is to so form the fastening means as to distribute the strain over comparatively a large area and remove such strain from bolts.

With these and other objects in view the invention comprises certain novel constructions, arrangements and combination of parts as will be hereafter described and claimed.

In the drawings—Figure 1 represents a side elevation of a car wheel with my improved fastening means. Fig. 2 is a section on line 2—2 of Fig. 1 showing the means of securing the key to the wheel body. Fig. 3 is an enlarged detail vertical section of the wheel showing the connecting key in position. Fig. 4 is an enlarged fragmentary elevation of the invention, and Fig. 5 is a perspective detail of the fastening key.

Like characters of reference designate corresponding parts throughout the several views.

Heretofore the means used in practice for fastening the rim to the hub of the wheel has required the use of bolts, and when undue strain is brought to bear upon the rim of the wheel it has been found that these bolts will shear and an accident is the result of said construction.

My present invention aims to remove the strain from bolts and distribute it more evenly over the area of a key which will not shear or otherwise fail under unusual strain.

In general the invention consists in forming integral with the body of the wheel outstanding lugs which form recesses with the rim into which recesses a suitable key is positioned, the strain being designed to come upon the key.

In the following detailed description one specific embodiment of the invention is shown.

In the drawings 1 represents the wheel body which may be formed as a disk or a spoke as the case may be. Formed integral with the body 1 and extending around the entire periphery thereof is a flange 2, the purpose of which is to limit the movement of the rim 4 of the wheel. Formed integral with the body 1 is a plurality of arcuate flanges or lugs 3 extending from the surface of the body 1 at any desirable angle. Although four such lugs have been shown it is to be understood that any number and arrangement of such lugs could be used as long as parts of the joint between the body 1 and the rim 4 are visible. The rim 4 having the ordinary tread and flange has formed on its sides shouldered recesses 5 and 6 which are defined by an integrally extending flange 7, the inner face of the flange 7 being designed to fit tightly against the outer periphery of the wheel 1. As shown here the flange 2 is designed to be received by a shouldered recess 5, it being understood of course that flange 2 and recess 5 can be made of any desirable dimensions. Formed between the inner surface of the extending lug 3 and the shouldered recess 6 is a key recess 8 into which is placed a key 9 which has formed at one end thereof a rectangular lug 10 and at the other end thereof a flattened portion 11 provided with a hole or opening 12, that part of the key 9 extending between the ends 10 and 11 being provided with a beveled face 13 which is designed to fit accurately against the inner surface of extending lug 3. As shown in Fig. 5 this key may be made in a straight piece with parallel sides, in which event the material from which the key is formed must necessarily be soft enough to bend as it is driven into the recess 8. This key is preferably made of a soft material which will readily absorb the shock to which the wheel is subjected, although it is to be understood that the key may be made of harder material, in which event it would be necessary either to machine member 9 in arcuate form in the first instance or bend it prior to placing it in recess 8.

In assembling this wheel the rim 4 is slipped around the outer periphery of wheel body 1 until the shouldered recess 5 engages the flange 2 on the body 1. If necessary of course the periphery of the body 1 and the inner surface of the flange 7 may be given a slight taper. When the flange 2 engages the shouldered recess 5 there will be a series of recesses 8 forced between flanges 3 and shouldered recesses 6 into which the key 9 is forced, the shoulder 10 being designed to abut one end of the lug 3. To hold key 9 in position a bolt 14 is passed through the body of the wheel and secured by a nut on the reverse side of the body 1. Then a screw bolt 15 is passed through opening 12. As shown in Fig. 5 the flattened end 11 is bent forward at a slight angle from the plane of the back of key 9, the position of the plane being shown by dotted line 16. The object of bending this flattened end 11 forward is to provide for a simple means of locking the head of bolt 15.

By the construction shown it will be seen that the strain is removed almost entirely from bolts and thrown upon a key having a comparatively large surface. Also the greater part of the joint between the rim and the body of the wheel is visible so that any looseness can be readily perfected. Further, by having the greater part of this joint visible and easily reached it is possible to slip very thin pieces of sheet metal between the rim and the wheel body when the same becomes somewhat separated due to normal wearing.

What I claim is:

1. In a two-part wheel, a wheel body, a tire rim, means secured to corresponding edges of said rim and body preventing relative movement therebetween, lugs projecting from said body outwardly at an angle to the face of said body, an angular recess formed between said lugs and rim, and a strip inserted within said recess for holding said rim and wheel in forced relation, said strip having the same general cross action as the recess.

2. In a two-part wheel, a wheel body, a tire rim, means secured to said body and engaging said rim for preventing relative movement therebetween, lugs projecting from said body at an angle therefrom, recesses formed between said lugs and said rims, a strip beveled on one edge to conform to the other of said recesses, and means formed on one end of said strips for securing said strip to the wheel, whereby the rim and wheel body are held in fixed relation.

3. In a wheel provided with a removable tire, a wheel body, a flange on said body, projecting lugs extending from said wheel body, a tire rim, means carried by the rim for engaging said flange, and means associated with said rim and lugs for retaining the rim and wheel in fixed relation.

4. In a wheel provided with a removable tire, a wheel body, a flange formed on said body, projecting lugs on said body, a tire rim, a shouldered recess formed on either side of said rim, one recess positioned to receive said flange, a recess formed by said projecting lug and the other shouldered recess, and means received in said last mentioned recess for holding said rim and wheel in fixed relation.

5. In a wheel provided with a removable tire, a wheel body, a flange formed on said body, a plurality of arcuate lugs projecting from said body, a tire rim, and means on one side of said rim for engaging said lug, a plurality of irregular recesses in cross section formed between said lugs and said rim, and strips secured to said wheel body and contained within said recesses for holding said rim and wheel in fixed position.

6. In a wheel provided with a removable rim, a wheel body, a flange on said body, a plurality of arcuate lugs projecting from said body, a tire rim, means formed on one side of said rim for engaging said flange, a plurality of recesses formed between said lugs and said rim, a plurality of strips inserted in said recesses, and means preventing the accidental removal of said strips.

7. In a strip for fastening a rim to a car wheel body, a beveled edge formed on one edge of said strip, a lug projecting from one end of said strip and terminating said bevel, a flattened portion formed on the other end and provided with an opening, a bolt passing through said opening and secured to said wheel, and a bolt secured to said body and engaging said lug for preventing backward movement of the strip.

In testimony whereof I affix my signature in presence of two witnesses.

THOMAS J. KELLY.

Witnesses:
CARLE WHITEHEAD,
ALBERT L. VOGL.

Copies of this patent may be obtained for five cents each, by addressing the "Commissioner of Patents, Washington, D. C."